United States Patent
Kaliteevskiy et al.

(10) Patent No.: US 11,621,785 B2
(45) Date of Patent: Apr. 4, 2023

(54) QUANTUM COMMUNICATIONS SYSTEMS COMPRISING MULTIPLE-CHANNEL QUANTUM REPEATERS

(71) Applicant: CORNING INCORPORATED, Corning, NY (US)

(72) Inventors: Nikolay Alekseyevich Kaliteevskiy, Saint-Petersburg (RU); Fedor Dmitrievich Kiselev, Saint-Petersburg (RU); Michal Mlejnek, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/619,079

(22) PCT Filed: Jun. 16, 2020

(86) PCT No.: PCT/US2020/037856
§ 371 (c)(1),
(2) Date: Dec. 14, 2021

(87) PCT Pub. No.: WO2020/263618
PCT Pub. Date: Dec. 30, 2020

(65) Prior Publication Data
US 2022/0303022 A1   Sep. 22, 2022

Related U.S. Application Data

(60) Provisional application No. 62/868,234, filed on Jun. 28, 2019.

(51) Int. Cl.
*H04B 10/00* (2013.01)
*H04B 10/70* (2013.01)
(Continued)

(52) U.S. Cl.
CPC ............. *H04B 10/70* (2013.01); *H04B 10/29* (2013.01)

(58) Field of Classification Search
CPC .... H04B 10/29; H04B 10/291; H04B 10/297; H04B 10/2971; H04B 10/2972; H04B 10/298; H04B 10/299; H04B 10/70
See application file for complete search history.

(56) References Cited

U.S. PATENT DOCUMENTS

| | | | |
|---|---|---|---|
| 11,290,192 B2 | 3/2022 | Kaliteevskiy et al. | |
| 2012/0050834 A1* | 3/2012 | Harrison ................ | H04B 10/70 359/107 |
| 2017/0163415 A1* | 6/2017 | Gray ...................... | H04W 12/04 |
| 2018/0322921 A1 | 11/2018 | Brown et al. | |

FOREIGN PATENT DOCUMENTS

| WO | 2016/204847 A2 | 12/2016 |
|---|---|---|
| WO | 2019/160770 A1 | 8/2019 |

OTHER PUBLICATIONS

B. Korzh, et al. "Provably secure and practical quantum key distribution over 307 km of optical fibre," Nature Phot. vol. 9 No. 163, 2015.

(Continued)

*Primary Examiner* — Daniel G Dobson
(74) *Attorney, Agent, or Firm* — Svetlana Z. Short

(57) ABSTRACT

A quantum communications system includes a first quantum repeater and a second quantum repeater each positioned at a repeater node and each having a first quantum memory and a second quantum memory. A first channel switch is optically coupled to the first quantum repeater and a second channel switch is optically coupled to the second quantum repeater. Further, a first sub-channel extends between and optically couples the first channel switch and the first quantum memory of the first quantum repeater, a second sub-channel extends between and optically couples the first (Continued)

channel switch and the first quantum memory of the second quantum repeater, a third sub-channel extends between and optically couples the second channel switch and the second quantum memory of the first quantum repeater, and a fourth sub-channel extends between and optically couples the second channel switch and the second quantum memory of the second quantum repeater.

20 Claims, 4 Drawing Sheets

(51) Int. Cl.
    *H04B 10/29*     (2013.01)
    *H04J 14/00*     (2006.01)

(56) References Cited

OTHER PUBLICATIONS

Briegel, H.-J., et al., "Quantum Repeaters: The Role of Imperfect Local Operations in Quantum Communication", Phys. Rev Lett. vol. 81 No. 26, 1998, pp. 5932-5935.

Moiseev et al., "Broadband Multiresonator Quantum Memory-Interface", Scientific Reports 8, Artile No. 3982, 2018.

N. Sangouard et al., "Analysis of a quantum memory for photons based on controlled reversible inhomogeneous broadening", Phys. Rev. A75, Article No. 032327, 2007.

Zukowski, M., et al., "Event-Ready-Detectors Bell Experiment via Entanglement Swapping", Phys. Rev. Lett. 71, 1993, pp. 4287-4290.

International Search Report and Written Opinion of the International Searching Authority; PCT/US2020/037856; dated Oct. 7, 2020; 12 Pages; European Patent Office.

Liu et al., "Reduced effect of single-photon-detector deadtime using a switchable detector array in an orbital-angular-momentum (OAM) encoded quantum system", 2017 Conference on Lasers and Electro-Optics (cleo). the Optical Society, May 14, 2017, pp. 1-2.

Sangouard et al., "Quantum repeaters based on atomic ensembles and linear optics", Arxiv org, Cornell university library, Jun. 15, 2009, XP080329333.

Schettini et al., "Implementing a Multiplexed System of Detectors for Higher Photon Counting Rates", IEEE Journal of Selected Topics in Quantum Electronics, vol. 13, No. 4, Jul. 1, 2007, pp. 978-983.

\* cited by examiner

QUANTUM COMMUNICATIONS SYSTEMS COMPRISING MULTIPLE-CHANNEL QUANTUM REPEATERS

CROSS-REFERENCE TO RELATED APPLICATIONS

This application claims the benefit of priority under 35 U.S.C. § 371 of International Application No. PCT/US2020/037856, filed on Jun. 16, 2020, which claims the benefit of priority under 35 U.S.C. § 119 if U.S. Provisional Application No. 62/868,234, filed Jun. 28, 2019, the content of which is incorporated herein by reference in its entirety.

BACKGROUND

Field

The present specification generally relates to quantum communications systems having multiple quantum repeaters positioned at a single repeater node. More specifically, the present disclosure relates to quantum communications systems having channel switches that selectively optically couple photon sources to different quantum repeaters located at a single repeater node.

Technical Background

The field of quantum communications includes a wide variety of applications. One such application is quantum key distribution, which is a quantum communications process that is used to transfer a secret key among participants that is hard to decode by non-participants. Quantum key distribution systems may be limited in length due to the no cloning theorem of quantum mechanics, which prevents the use of classical signal amplifiers, causing increased photon attenuation when the length of these systems is increased. However, quantum repeaters may be used to overcome this attenuation problem. In particular, quantum repeaters may be used to entangle photons (often referred to as entanglement swapping), and communicate this entanglement over increased distances.

From system development and efficiency perspectives there are many opportunities for improvement in quantum communications systems that use quantum repeaters. It is of great interest to have faster, more efficient quantum communications systems than what is currently being utilized in the field. Currently, it is difficult for quantum repeaters to receive photons while releasing stored photons causing efficiency loss. Accordingly, a need exists for alternative, improved methods for quantum communication to increase the efficiency of entanglement swapping using quantum repeaters.

SUMMARY

In a first aspect, a quantum communications system includes a first quantum repeater and a second quantum repeater each positioned at a repeater node and each having a first quantum memory and a second quantum memory and a first channel switch optically coupled to the first quantum repeater and a second channel switch optically coupled to the second quantum repeater. Further, a first sub-channel extends between and optically couples the first channel switch and the first quantum memory of the first quantum repeater, a second sub-channel extends between and optically couples the first channel switch and the first quantum memory of the second quantum repeater, a third sub-channel extends between and optically couples the second channel switch and the second quantum memory of the first quantum repeater, and a fourth sub-channel extends between and optically couples the second channel switch and the second quantum memory of the second quantum repeater.

A second aspect includes the quantum communications system of the first aspect further having a first photon source and a second photon source. A first photon link extends between and optically couples the first photon source and the first channel switch a second photon link extends between and optically couples the second photon source and the second channel switch.

A third aspect includes the quantum communications system of the second aspect, wherein the first photon source and the second photon source each are an entangled photon generator.

A fourth aspect includes the quantum communications system of the second aspect or the third aspect, wherein the first photon link and the second photon link each comprise an optical fiber.

A fifth aspect includes the quantum communications system of any of the first through fourth aspects, wherein the first channel switch is actuatable between a first optical engagement position, which optically couples the first channel switch and the first sub-channel, and a second optical engagement position, which optically couples the first channel switch and the second sub-channel and the second channel switch is actuatable between a first optical engagement position, which optically couples the second channel switch and the third sub-channel, and a second optical engagement position, which optically couples the second channel switch and the fourth sub-channel.

A sixth aspect includes the quantum communications system of any of the first through fifth aspects, wherein the first channel switch and the second channel switch each are an optical switch.

A seventh aspect includes the quantum communications system of any of the first through sixth aspects, wherein the first quantum repeater and the second quantum repeater each include entanglement optics having two or more entangling pathways optically coupled to and extending between the first quantum repeater and the second quantum repeater and two entanglement detector systems.

An eighth aspect includes the quantum communications system of the seventh aspect, wherein the entanglement optics further include a beamsplitter positioned such that each entangling pathway traverses the beamsplitter and the entanglement optics are structurally configured to entangle pairs of particles when particles output by the first quantum memory and the second quantum memory simultaneously traverse the beamsplitter.

A ninth aspect includes the quantum communications system of the seventh aspect or the eighth aspect, wherein the entanglement optics further include two or more optical switches.

A tenth aspect includes the quantum communications system of any of the first through ninth aspects, wherein the first quantum memory of each quantum repeater is structurally configured to, upon receipt of a photon pulse directed into the first quantum memory in an memory input direction, absorb the photon pulse thereby exciting an atomic ensemble state of the first quantum memory from a first energy state into a second energy state and, upon return of the atomic ensemble state of the first quantum memory to the first energy state, release a particle comprising quantum bit information of the received photon pulse from the first quantum memory in a memory output direction, opposite the memory input direction.

In an eleventh aspect, a method of communicating information includes outputting a first photon pulse sequence from a first photon source through a first photon link and into a first channel switch. The first channel switch is disposed between and optically coupled to the first photon link and both a first quantum repeater and a second quantum repeater, each positioned at a repeater node. A first sub-channel is optically coupled the first channel switch and the first quantum repeater. A second sub-channel is optically coupled to the first channel switch and the second quantum repeater. Further, the first channel switch is actuatable between a first optical engagement position, in which the first photon source is optically coupled to the first quantum repeater through the first sub-channel, and a second optical engagement position, in which the first photon source is optically coupled to the second quantum repeater through the second sub-channel. The method also includes directing a first sub-sequence of the first photon pulse sequence into the first sub-channel when the first channel switch is in the first optical engagement position, such the first quantum repeater receives the first sub-sequence of the first photon pulse sequence switching the first channel switch from the first optical engagement position into the second optical engagement position, thereby directing a second sub-sequence of the first photon pulse sequence into the second sub-channel such that the second quantum repeater receives the second sub-sequence of the first photon pulse sequence.

A twelfth aspect includes the method of the eleventh aspect, wherein the first quantum repeater and the second quantum repeater each include a first quantum memory and a second quantum memory and the first sub-channel of the first channel switch is optically coupled to the first quantum memory of the first quantum repeater and the second sub-channel of the first channel switch is optically coupled to the first quantum memory of the second quantum repeater.

A thirteenth aspect includes the method of the twelfth aspect wherein the first quantum repeater and the second quantum repeater each include entanglement optics having two or more entangling pathways optically coupled to and extending between the first quantum memory and the second quantum memory and two entanglement detector systems, wherein the entanglement optics further include a beamsplitter positioned such that each entangling pathway traverses the beamsplitter and the entanglement optics are structurally configured to entangle pairs of particles when particles output by the first quantum memory and the second quantum memory simultaneously traverse the beamsplitter.

A fourteenth aspect includes the method of any of the eleventh through the thirteenth aspects, further including outputting a second photon pulse sequence from a second photon source though a second photon link and into a second channel switch. The second channel switch is disposed between and optically coupled to the second photon link and both the first quantum repeater and the second quantum repeater. A third sub-channel is optically coupled to the second channel switch and the first quantum repeater. A fourth sub-channel is optically coupled to the second channel switch and the second quantum repeater. Further, the second channel switch is actuatable between a first optical engagement position, in which the second photon source is optically coupled to the first quantum repeater through the third sub-channel, and a second optical engagement position, in which the second photon source is optically coupled to the second quantum repeater through the fourth sub-channel. The method also includes directing a first sub-sequence of the second photon pulse sequence into the third sub-channel when the second channel switch is in the first optical engagement position, such the first quantum repeater receives the first sub-sequence of the second photon pulse sequence and switching the second channel switch from the first optical engagement position to the second optical engagement position, thereby directing a second sub-sequence of the second photon pulse sequence into the fourth sub-channel such that the second quantum repeater receives the second sub-sequence of the second photon pulse sequence.

A fifteenth aspect includes the method of the fourteenth aspect, wherein the first quantum repeater and the second quantum repeater each include a first quantum memory and a second quantum memory, the first sub-channel of the first channel switch is optically coupled to the first quantum memory of the first quantum repeater and the second sub-channel of the first channel switch is optically coupled to the first quantum memory of the second quantum repeater, and the first sub-channel of the second channel switch is optically coupled to the second quantum memory of the first quantum repeater and the second sub-channel of the second channel switch is optically coupled to the second quantum memory of the second quantum repeater.

A sixteenth aspect includes the method of the fifteenth aspect, wherein the first sub-sequence of the first photon pulse sequence and the first sub-sequence of the second photon pulse sequence are simultaneously directed into the first quantum memory and the second quantum memory of the first quantum repeater, respectively and thereafter, the second sub-sequence of the first photon pulse sequence and the second sub-sequence of the second photon pulse sequence are simultaneously directed into the first quantum memory and the second quantum memory of the second quantum repeater, respectively.

A seventeenth aspect includes the method of the sixteenth aspect, the method further including absorbing the first sub-sequence of the first photon pulse sequence and the first sub-sequence the second photon pulse sequence using the first quantum memory and the second quantum memory of the first quantum repeater, respectively, thereby exciting an atomic ensemble state of the first quantum memory and the second quantum memory of the first quantum repeater from a first energy state into a second energy state and upon return of the atomic ensemble state of the first quantum memory and the second quantum memory of the first quantum repeater to the first energy state, releasing, from the first quantum memory and the second quantum memory of the first quantum repeater, a plurality of particles with quantum bit information of the received first sub-sequences.

An eighteenth aspect includes the method of the seventeenth aspect, wherein the plurality of particles with the quantum bit information of the received first sub-sequences are released from the first quantum memory in a first memory output direction and released from the second quantum memory in a second memory output direction and the first memory output direction of the first quantum memory is opposite a first memory input direction of the first quantum memory and the second memory output direction of the second quantum memory is opposite a second memory input direction of the second quantum memory.

A nineteenth aspect includes the method of the seventeenth or the eighteenth aspect, wherein, when the second sub-sequence of the first photon pulse sequence and the second sub-sequence of the second photon pulse sequence are simultaneously directed into the first quantum memory and the second quantum memory of the second quantum repeater, the plurality of particles with quantum bit information of the received first sub-sequences are released from the first quantum memory and the second quantum memory of the first quantum repeater.

A twentieth aspect includes the method of any of the fourteenth through the nineteenth aspects wherein the first photon source and the second photon source each are an entangled photon generator.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
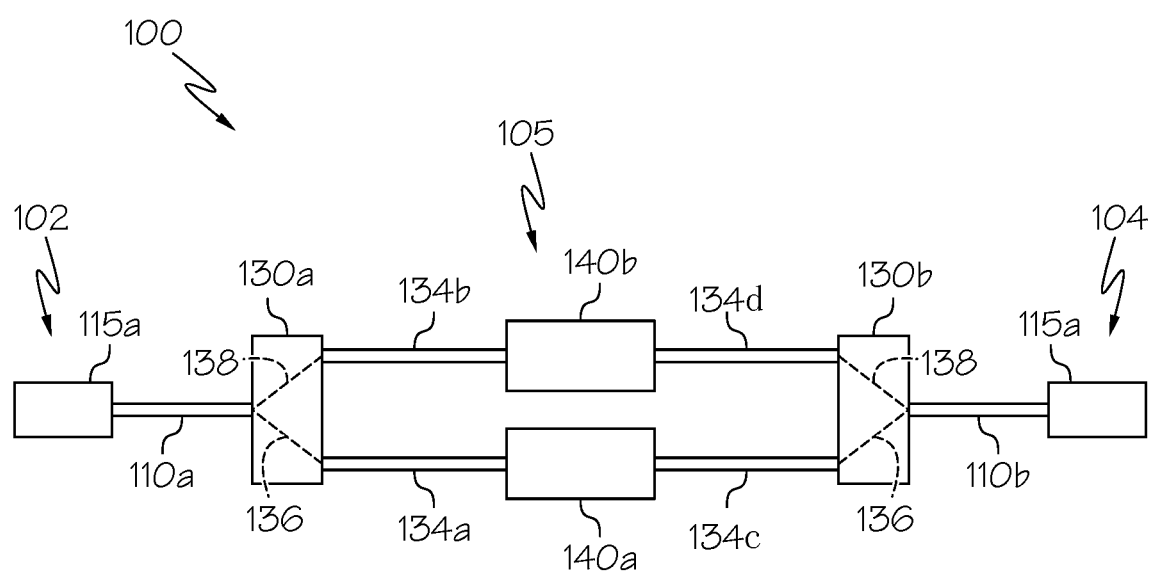
FIG. 1 schematically depicts a quantum communications system comprising two photon sources, two channel switches, and two quantum repeaters, according to one or more embodiments shown and described herein.

Reference will now be made in detail to embodiments of quantum communication systems that include quantum repeaters for use in quantum communications processes such as quantum key distribution, examples of which are illustrated in the accompanying drawings. Whenever possible, the same reference numerals will be used throughout the drawings to refer to the same or like parts. Example quantum communications systems implementing quantum repeaters may be found in International Pub. No. WO 2016/204847 titled "Systems and Methods for Quantum Key Generation," incorporated herein by reference, as well as N. Sangouard et al, "Quantum repeaters based on atomic ensembles and linear optics" Review of Modern Physics, v. 83, January-March 2011. As described in these references, the use of quantum repeaters can facilitate entanglement over an increased distance by entanglement swapping of pairs of photons at each quantum repeater in a quantum communications system. Thus, any single pair of photons must only travel a portion of the full length of a quantum communications system. To facilitate entanglement swapping, each quantum repeater may comprise two quantum memories, each positioned to receive photon pulses from different photons sources, e.g., a first quantum repeater for receiving photons from a first photon source and a second quantum repeater for receiving photons from a second photon source. However, when a single quantum repeater is used to receive photons from two photon sources, it is difficult (or not possible) to simultaneously receive photons from both photons sources and release stored photons such that these stored photons may be measured and entangled, thus causing quantum repeater dead time. Moreover, it is difficult for a single quantum repeater to emit stored photons by backward emission, a process which increases the entanglement efficiency of a quantum repeater. Thus, improved quantum communications systems that reduce and/or eliminate quantum repeater dead time and facilitate backward emission are desired.

Accordingly, quantum communications systems are described herein that use multiple quantum repeaters positioned at a repeater node, each optically coupled to multiple channel switches. The channel switches allow received photon pulse sequences to be sequentially divided into sub-sequences and directed into different quantum repeaters. Thus, one sub-sequence may be received and stored by one quantum repeater (i.e., during a receiving phase), while the other quantum repeater releases and measures a previously received sub-sequence (i.e., during a measuring phase), facilitating continuous operation of the quantum communications system while allowing for the backward emission of stored photons. These improved quantum communications systems are described herein with specific references to the appended drawings.

Referring now to FIG. 1, a quantum communications system 100 is schematically depicted. The quantum communications system 100 comprises a first photon source 115$a$, a second photon source 115$b$, a first quantum repeater 140$a$, and a second quantum repeater 140$b$. The first quantum repeater 140$a$ and the second quantum repeater 140$b$ are each positioned between the first photon source 115$a$ and the second photon source 115$b$ at a repeater node 105. The first photon source 115$a$ and the second photon source 115$b$ are each optically coupled to the first quantum repeater 140$a$ and the second quantum repeater 140$b$. The quantum communications system 100 also includes a first channel switch 130$a$ positioned between and optically coupled to the first photon source 115$a$ and the repeater node 105 and a second channel switch 130$b$ positioned between and optically coupled to the second photon source 115$b$ and the repeater node 105. In operation, the first channel switch 130$a$ may selectively direct photons from the first photon source 115$a$ to the first quantum repeater 140$a$ or the second quantum repeater 140$b$ and the second channel switch 130$b$ may selectively direct photons from the second photon source 115$b$ to the first quantum repeater 140$a$ or the second quantum repeater 140$b$. As used herein, "optically coupled" refers to two or more components arranged such that photons pulses and/or quantum information may be transferred therebetween. Further, as shown in more detail in FIGS. 2 and 3, the first quantum repeater 140a and the second quantum repeater 140b each comprise a first quantum memory 145a and a second quantum memory 145b.

In FIG. 1, the first photon source 115a is positioned at a first end 102 (often referred to as "Alice") of the quantum communications system 100 and the second photon source 115b is positioned at a second end 104 (often referred to as "Bob") of the quantum communications system 100. However, it should be understood that the first photon source 115a and the second photon source 115b may be intermediately positioned photon sources of a larger quantum communications system 100. For example, larger quantum communications systems 100 may comprise a plurality of photon sources 115 interleaved between a plurality of repeater nodes 105, each repeater node 105 comprising two quantum repeaters 140.

In some embodiments, the first photon source 115a and the second photon source 115b may comprise a photon generator structurally configured to generate and output one or more photon pulses, for example, a photon pulse sequence comprising a plurality of photon pulses, which may comprise any single wavelength λ, for example, from 800 nm to 1800 nm, such as 800 nm, 1310 nm, 1550 nm, or the like. In some embodiments, this photon generator is an entangled photon generator configured to generate and output entangled photons pairs that may form entangled photon pulse sequences. For example, the first photon source 115a and the second photon source 115b may output two entangled photon pulse sequences, one directed toward the repeater node 105 and another directed away from the repeater node 105, for example, toward additional optical components of the quantum communications system 100, such as additional repeater nodes 105. As one example, the first and second photon sources 115a, 115b may comprise laser sources optically coupled to one or more non-linear crystals and may be configured to generate entangled photon pairs using a parametric down conversion process. As another example, first and second photon sources 115a, 115b may generate entangled photon pairs using a four-wave mixing process. Moreover, it should be understood that the first and second photon sources 115a, 115b may comprise any known or yet to be developed device for generating entangled photons and may employ any technique of generating entangled photons.

In operation, photon pulses output by the first and second photon sources 115a, 115b may comprise quantum bit information. As used herein, "quantum bit information" refers to a photon property that may be used to form a quantum communication, for example, a quantum key. Example quantum information bits include a measurable quantum property of the photon, for example a polarization, such as a linear polarization, a circular polarization, an elliptical polarization, or any other polarization, translational momentum, orbital angular momentum, phase or the like.

Figure 2:
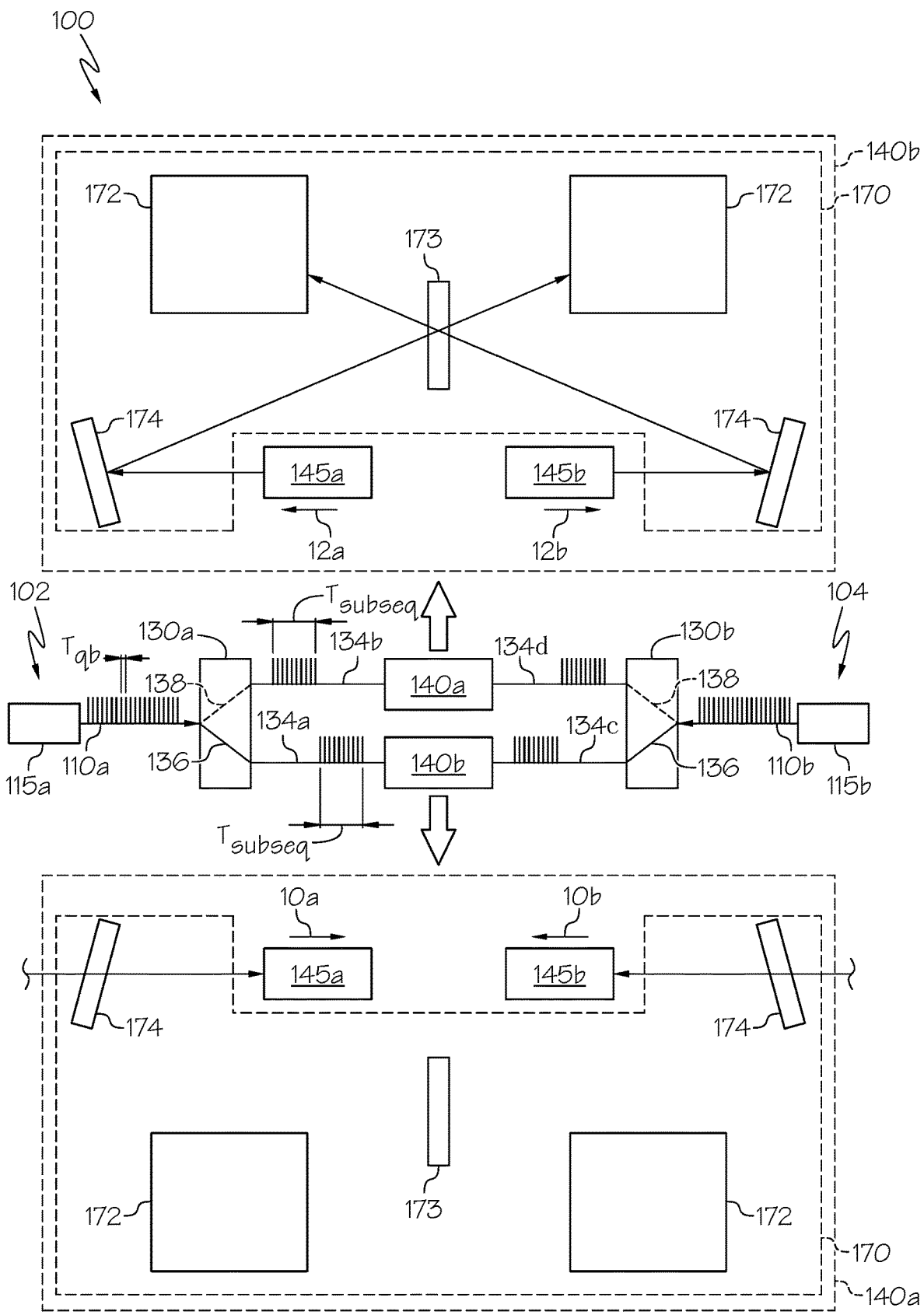
FIG. 2 schematically depicts the quantum communications system of FIG. 1 during a receiving phase of a first quantum repeater and a measuring phase of a second quantum repeater, according to one or more embodiments shown and described herein.
Figure 3:
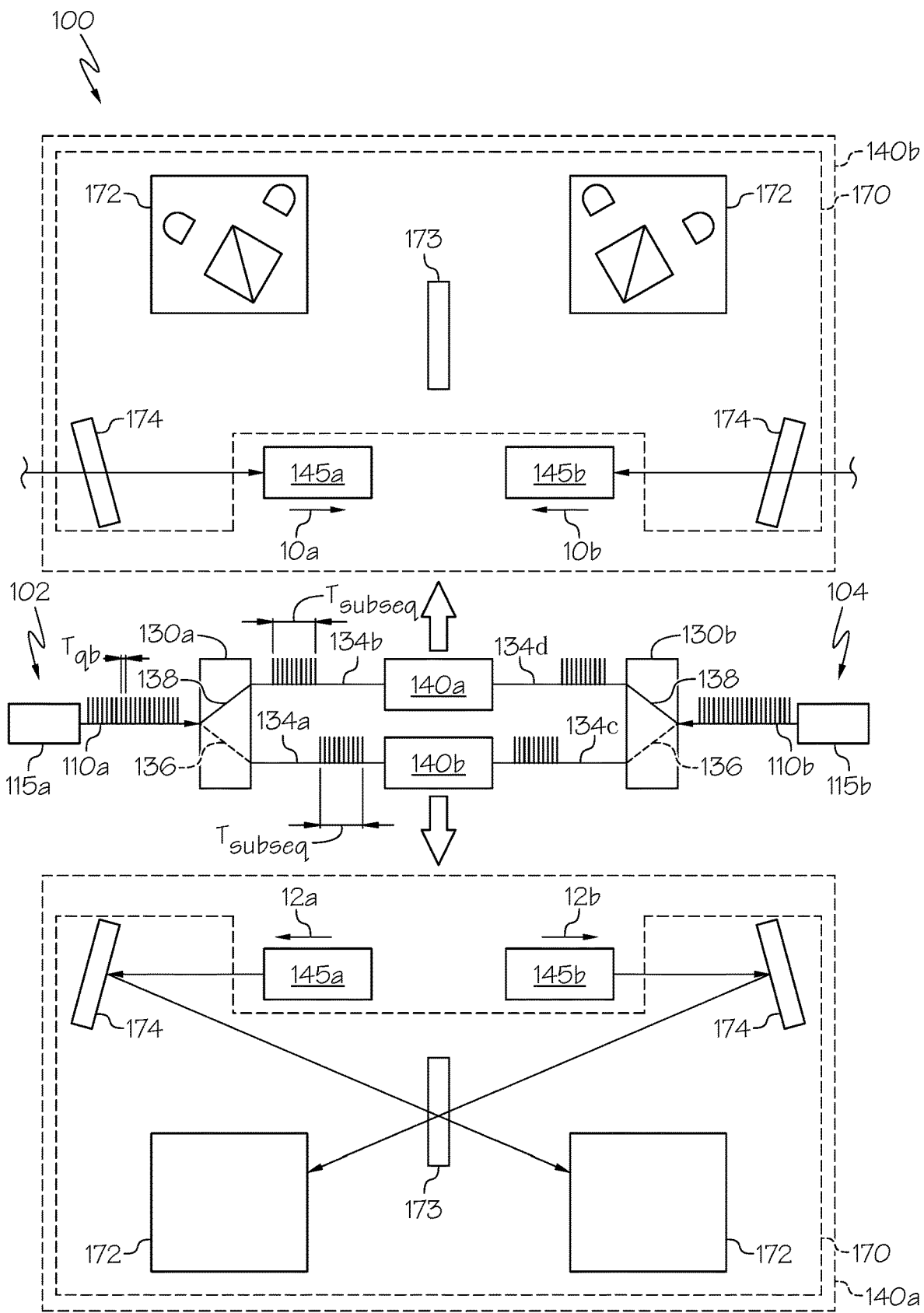
FIG. 3 schematically depicts the quantum communications system of FIG. 1, during a measuring phase of the first quantum repeater and a receiving phase of the second quantum repeater, according to one or more embodiments shown and described herein.

Referring now to FIGS. 1-3, the first channel switch 130a is optically coupled to the first photon source 115a and both the first quantum repeater 140a and the second quantum repeater 140b and the second channel switch 130b optically coupled to the second photon source 115b and both the first quantum repeater 140a and the second quantum repeater 140b. In some embodiments, the first channel switch 130a and the second channel switch 130b are each optical switches. A first photon link 110a extends between and optically couples the first photon source 115a and the first channel switch 130a and a second photon link 110b extends between and optically couples the second photon source 115b and the second channel switch 130b. The first and second photon links 110a, 110b may comprise an optical waveguide, such as an optical fiber comprising a core and a cladding surrounding the core, a planar waveguide, or the like. Alternatively, the first and second photon links 110a, 110b may comprise a pathway, which may be located in a vacuum or in an atmosphere, and this pathway may or may not include intervening optical components, such as lenses (e.g., focusing lenses, collimating lenses, atmosphere, etc.), mirrors, or the like.

The quantum communications system 100 further comprises a first sub-channel 134a, a second sub-channel 134b, a third sub-channel 134c, and a fourth sub-channel 134d. The first sub-channel 134a extends between and optically couples the first channel switch 130a and the first quantum memory 145a of the first quantum repeater 140a. The second sub-channel 134b extends between and optically couples the first channel switch 130a and the first quantum memory 145a of the second quantum repeater 140b. The third sub-channel 134c extends between and optically couples the second channel switch 130b and the second quantum memory 145b of the first quantum repeater 140a. Further, the fourth sub-channel 134d extends between and optically couples the second channel switch 130b and the second quantum memory 145b of the second quantum repeater 140b. The first through fourth sub-channels 134a-d may comprise optical waveguides, such as optical fibers comprising a core and a cladding surrounding the core, planar waveguides, or the like. Alternatively, the first through fourth sub-channels 134a-d may comprise a pathway, which may be located in a vacuum or in an atmosphere, and this pathway may or may not include no intervening optical components such as lenses (e.g., focusing lenses, collimating lenses, atmosphere, etc.), mirrors, or the like.

Furthermore, the first channel switch 130a and the second channel switch 130b are each actuatable between a first optical engagement position 136 and a second optical engagement position 138. When the first channel switch 130a is in the first optical engagement position 136, as depicted in FIG. 2, the first channel switch 130a is optically coupled to the first sub-channel 134a, thereby optically coupling the first photon source 115a and the first quantum memory 145a of the first quantum repeater 140a. When the first channel switch 130a is in the second optical engagement position 138, as depicted in FIG. 3, the first channel switch 130a is optically coupled to the second sub-channel 134b, thereby optically coupling the first photon source 115a and the first quantum memory 145a of the second quantum repeater 140b. When the second channel switch 130b is in the first optical engagement position 136, as depicted in FIG. 2, the second channel switch 130b is optically coupled to the third sub-channel 134c, thereby optically coupling the second photon source 115b and the second quantum memory 145a of the first quantum repeater 140a. Furthermore, when the second channel switch 130b is in the second optical engagement position 138, as depicted in FIG. 3, the second channel switch 130b is optically coupled to the fourth sub-channel 134d, thereby optically coupling the second photon source 115b and the second quantum memory 145b of the second quantum repeater 140b.

While two optical engagement positions 136, 138 are depicted, it should be understood that each channel switch 130a, 130b may comprise any number of optical engagement positions, for example, in embodiments comprising more than two quantum repeaters positioned at the repeater node 105, each channel switch 130a, 130b may comprise the same number of optical engagement positions and the same number of sub-channels as the number of quantum repeaters 140 at the repeater node 105. In addition, as described in more detail below, the first and second channel switches 130a, 130b facilitate continuous entanglement swapping by directing photon pulses into one quantum repeater (e.g., during a receiving phase) while the other quantum repeater entangling these received photon pulses (e.g., during a measuring phase). For example, FIG. 2 depicts the first quantum repeater 140a in a receiving phase and depicts the second quantum repeater 140b in a measuring phase and FIG. 3 depicts the first quantum repeater 140a in a measuring phase and the second quantum repeater 140b in a receiving phase.

Referring now to FIGS. 2 and 3, the first quantum repeater 140a and the second quantum repeater 140b are depicted in more detail. Each quantum repeater 140a, 140b is structurally configured to entangle a pair of photons. While not intending to be limited by theory, quantum repeaters are devices that enable entanglement swapping. One early quantum repeater design is described in Zukowski, M., A. Zeilinger, M. A. Home, and A. K. Ekert "Event-Ready-Detectors Bell Experiment via Entanglement Swapping", Phys. Rev. Lett. 71, 4287 (1993)]. This quantum repeater accepted two inputs (e.g. from Alice and from Bob) and entangled them, thus enabling exchange of information between Alice and Bob, possibly over longer distances than Alice and Bob would be able to do without the quantum repeater.

The first quantum repeater 140a and the second quantum repeater 140b of the quantum communications system 100 each comprise the first quantum memory 145a, the second quantum memory 145b, and entanglement optics 170. While not intending to be limited by theory, each quantum memory 145a, 145b is structurally configured to, upon receipt of a photon pulse, absorb the photon pulse via a non-linear optical process thereby exciting an atomic ensemble state of the quantum memory 145a, 145b from a first energy state, such as a ground state, into a second energy state, such as a non-ground state, for example, an excited state. As used herein, "atomic ensemble state" refers to the arrangement of energy states of the atoms that comprise the quantum memory 145a, 145b. As a non-limiting example, in the first energy state, the electrons of the quantum memory 145a, 145b may be in a ground state and in the second energy state, some of those electrons may move into an excited state. In some embodiments, the first energy state may have a lower total energy than the second energy state.

Then, after a period of time, the atomic ensemble state of the quantum memory 145a, 145b returns to the first energy state and a particle, such as another photon pulse is released from each quantum memory 145a, 145b. In particular, the atomic ensemble state of each quantum memory 145a and the second quantum memory 145b may return to the first energy state after a period of time, without an outside stimulus, or upon receipt of an outside stimulus, such as a pump signal received from a pump laser. Furthermore, the particles (e.g., photon pulses) released by the first quantum memory 145a and the second quantum memory 145b may comprise the quantum bit information (e.g., the quantum properties) of the photon pulse received by the first quantum memory 145a and the second quantum memory 145b, respectively, such as coherence properties, and may be directed into the entanglement optics 170 of the quantum repeater 140, where these particles undergo entanglement swapping.

The first quantum memory 145a and the second quantum memory 145b of each quantum repeater 140a, 140b may comprise any known or yet to be developed quantum memory, such as a quantum memory based on an atomic frequency comb (AFC) atomic ensemble or a quantum memory based on a controlled reversible inhomogeneous broadening (CRIB) atomic ensemble. Using each of these atomic ensembles, individual photon pulses may be absorbed in such a manner that the quantum bit information of the received photon pulse is preserved by the atomic ensemble and can be released as a particle (e.g., a released photon) that shares quantum bit information with a corresponding received and absorbed photon, for example, some or all of the measureable quantum properties of the corresponding received and absorbed photon. For example, the released photon may be released upon request (e.g., upon receipt of a pump pulse) or after a set delay.

Some example quantum memories are described in Sangouard et al., "Quantum Repeaters Based on Atomic Ensembles and Linear Optics"; Review of Modern Physics, vol. 83 January-March 2011; pp. 33-80, in which quantum memories are used in quantum repeaters to enable entanglement swapping. Other example quantum memories include the quantum memory systems described in U.S. Pat. Pub. No. 2018/0322921 titled "Quantum Memory Systems and Quantum Repeater Systems Comprising Doped Polycrystalline Ceramic Optical Devices and Methods of Manufacturing the Same," assigned to Corning Incorporated of Corning, New York. Yet other example quantum memories may be realized in radio frequencies (RF), where an electromagnetic field of photons is used as an elemental carrier of information along waveguides (e.g., metallic, superconducting waveguides) that interact with resonators. An example of this approach is described in Moiseev et al., "Broadband Multiresonator Quantum Memory-Interface", Scientific Reports 8:3982 (2018). In addition, this waveguide and resonator approach can be used with photons in the visible and infrared waveguide range.

In operation, photon pulses are directed from the first photon source 115a into the first quantum memory 145a of both the first quantum repeater 140a (FIG. 2) and the second quantum repeater 140b (FIG. 3) in a memory input direction 10a and are directed from the second photon source 115b into the second quantum memory 145b of both the first quantum repeater 140a (FIG. 2) and the second quantum repeater 140b (FIG. 3) in a memory input direction 10b. Particles (such as photon pulses) are released from the first quantum memory 145a of the first quantum repeater 140a or the second quantum repeater 140a into the entanglement optics 170 of that particular quantum repeater in a memory output direction 12a and are released from the second quantum memory 145b of the first quantum repeater 140a or the second quantum repeater 140a into the entanglement optics 170 of that particular quantum repeater in a memory output direction 12b. Splitting the photon pulse sub-sequences using the channel switches 130a, 130b allows the quantum repeaters 140a, 140b perform measurements and generate entanglement by backwards emission of particles, in which the memory output direction 12a of the first quantum memory 145a of each of the first and second quantum repeaters 140a, 140b is opposite the memory input direction 10a and the memory output direction 12b of the second quantum repeater 145b of each of the first each of the first and second quantum repeaters 140a, 140b is opposite the memory input direction 10b, as depicted in FIGS. 2 and 3.

Referring still to FIGS. 2 and 3, the entanglement optics 170 comprise two or more entangling pathways 171 optically coupled to and extending between the two quantum memories 145a, 145b and two entanglement detectors 172. The entanglement optics 170 may further comprise a beamsplitter 173 and two or more optical switches 174. The beamsplitter 173 positioned such that each entangling pathway 171 traverses the beamsplitter 173. The two or more optical switches 174 are positioned such that particles output by a quantum memory 145 impinge at least one optical switch 174. For example, an optical switch 174 may be positioned along an entangling pathway 171 between a quantum memory 145 and a beamsplitter 173. The optical switches 174 are selectively transmissive and selectively reflective. For example, the optical switches 174 transmit photon pulse sequences output by the first or second photon source 115a, 115b such that these photons may be received the first quantum memory 145a and the second quantum memory 145b and the optical switches 174 reflect particles released by the first quantum memory 145a and the second quantum memory 145b and direct those particles toward the beamsplitter 173. In operation, particles released by the first quantum memory 145a and the second quantum memory 145b are each directed toward an optical switch 174 then through the beamsplitter 173, after which they are received by the entanglement detectors 172. Without intending to be limited by theory, the entanglement optics 170 to entangle pairs of particles when particles output by the quantum memories 145a, 145b simultaneously traverse the beamsplitter 173.

Referring now to FIGS. 1-3, in some embodiments, the quantum communications system 100 may be implemented as an integrated photonic device, such as an "on chip" device for optical field propagation and manipulation via electro-optic or acousto-optic phenomena to achieve, e.g. electronic switching. Each component of the quantum communications system 100 may be embedded into a planar waveguide or may be a portion of the planar waveguide. The repeater node 105 and the first and second channel switch 130a, 130b may be imbedded into or may be a portion of a planar waveguide, for example, the first and second channel switch 130a, 130b may be buried, laser-written waveguides. In other embodiments, the quantum communications system 100 may comprise bulk optics.

Referring now to FIG. 1-3, a method of communicating information (e.g., quantum information) using the quantum communications system 100 will now be described in more detail. This method facilitates entanglement swapping between the first end 102 (e.g., Alice) and the second end 104 (e.g., Bob) of the quantum communications system 100. The method comprises outputting (e.g., generating) a first photon pulse sequence from the first photon source 115a through the first photon link 110a and into the first channel switch 130a and outputting (e.g., generating) a second photon pulse sequence from the second photon source 115b though the second photon link 110b and into the second channel switch 130b. In some embodiments, the first photon source 115a and the second photon source 115b output photon pulse sequences simultaneously. Each photon pulse sequence comprises temporally adjacent photon pulses temporally spaced by a pulse spacing period $T_P$.

When the first photon pulse sequence and the second photon pulse sequence are received by the first channel switch 130a and the second channel switch 130b, respectively, the first channel switch 130a and the second channel switch 130b are in the first optical engagement position 136. Thus, a first sub-sequence of the first photon pulse sequence is directed into the first sub-channel 134a of the first channel switch 130a, such that the first quantum memory 145a of the first quantum repeater 140a receives the first sub-sequence of the first photon pulse sequence and a first sub-sequence of the second photon pulse sequence is directed into the first sub-channel 134a of the second channel switch 130b, such that the second quantum memory 145b of the first quantum repeater 140b receives the first sub-sequence of the second photon pulse sequence. In some embodiments, the first sub-sequence of the first photon pulse sequence and the first sub-sequence of the second photon pulse sequence are simultaneously directed into the first quantum memory 145a and the second quantum memory 145b of the first quantum repeater 140a. Each sub-sequence comprises adjacent photon pulses and comprises a sub-sequence period $T_{subseq}$.

When the first quantum memory 145a of the first quantum repeater 140a receives the first sub-sequence of the first photon pulse sequence, the first quantum memory 145a absorbs the first sub-sequence of the first photon pulse sequence. Similarly, when the second quantum memory 145b of the first quantum repeater receives the first sub-sequence of the second photon pulse sequence, the second quantum memory 145b absorbs the first sub-sequence of the second photon pulse sequence. Without intending to be limited by theory, this absorption excites an atomic ensemble state of both first quantum memory 145a and the second quantum memory 145b of the first quantum repeater 140a from a first energy state into a second energy state. Thus, at this stage of the method, the first quantum repeater 140a is in the receiving phase.

Next, the method comprises switching the first channel switch 130a from the first optical engagement position 136 to the second optical engagement position 138, thereby directing a second sub-sequence of the first photon pulse sequence into the second sub-channel 134b of the first channel switch 130a, such that the first quantum memory 145a of the second quantum repeater 140b receives the second sub-sequence of the first photon pulse sequence. Simultaneously, the method also comprises switching the second channel switch 130b from the first optical engagement position 136 to the second optical engagement position 138, thereby directing a second sub-sequence of the first photon pulse sequence into the second sub-channel 134b of the second channel switch 130b, such that the second quantum memory 145a of the second quantum repeater 140b receives the second sub-sequence of the second photon pulse sequence. At this stage of the method, the second quantum repeater 140b is in the receiving stage, as depicted in FIG. 3 such that the first quantum memory 145a of the second quantum repeater 140b absorbs the second sub-sequence of the first photon pulse sequence and the second quantum memory 145b of the second quantum repeater 140b absorbs the second sub-sequence of the first photon pulse sequence.

Meanwhile, the first quantum repeater 140a may enter the measuring phase when the second quantum repeater 140b is in the receiving phase, e.g., when the second sub-sequences of the first and second photon pulse sequences are directed into the first quantum memory 145a and the second quantum memory 145b of the second quantum repeater 140b, as depicted in FIG. 3. During the measuring phase of the first quantum repeater 140a, the atomic ensemble state of the first quantum memory 145a and the second quantum memory 145b of the first quantum repeater 140b return to the first energy state, releasing, from the first quantum memory 145a and the second quantum memory 145b of the first quantum repeater 140a, a plurality of particles (e.g., photons) comprising quantum bit information of the received first sub-sequences. Without intending to be limited by theory, the atomic ensemble state of the first quantum memory 145a and the second quantum memory 145b may return to the first energy state after a period of time, without an outside stimulus, or upon receipt of an outside stimulus, such as a pump signal received from a pump laser. Once particles (e.g., photons) are released from the first quantum memory 145a and the second quantum memory 145b these particles traverse the entanglement optics 170 and undergo entanglement.

Next, after the first quantum memory 145a and the second quantum memory 145b of the first quantum repeater 140a release particles, the first channel switch 130a and the second channel switch 130 may actuate from the second optical engagement position 138 back to the first optical engagement position 136 and the first and quantum memory 145a and the second quantum memory 145b may again receive and absorb sub-sequences of the first photon pulse sequence and the second photon pulse sequence. At this point, the first quantum repeater 140a is back in the reviving phase and the second quantum repeater 140b is in the measuring phase, as depicted in FIG. 2. The method may then be repeated for any number of iterations necessary to complete a communications task, for example, to distribute a quantum key to both Alice and Bob.

Splitting the photon pulse sub-sequences using the channel switches 130a, 130b facilitates a continuous operation of the quantum communications system 100. For example, some quantum repeaters use quantum memories that are unable to simultaneously operate in the receiving mode and the measuring mode, such that during the measuring mode, additional photon pulses cannot be received and processed, creating quantum repeater dead time. However, splitting the photon pulse sub-sequences using the channel switches 130a, 130b reduces or eliminates the quantum repeater dead time. Each channel switch 130a, 130b switches from optical engagement with the first quantum repeater 140a into optical engagement with the second quantum repeater 140b (and vice versa) in a switching period, which in some embodiments is less than the pulse spacing period $T_P$ such that temporally adjacent photon pulses of the photon pulse sequence can be directed into different quantum repeaters 140 without losing photon pulses due to the switching process thereby eliminating the effect of quantum repeater dead time on the quantum communications system 100. In addition, splitting the photon pulse sub-sequences using the channel switches 130a, 130b allows the quantum repeaters 140a, 140b perform measurements and generate entanglement backward emission of particles, which increases entanglement efficiency of each quantum repeater 140

Figure 4:
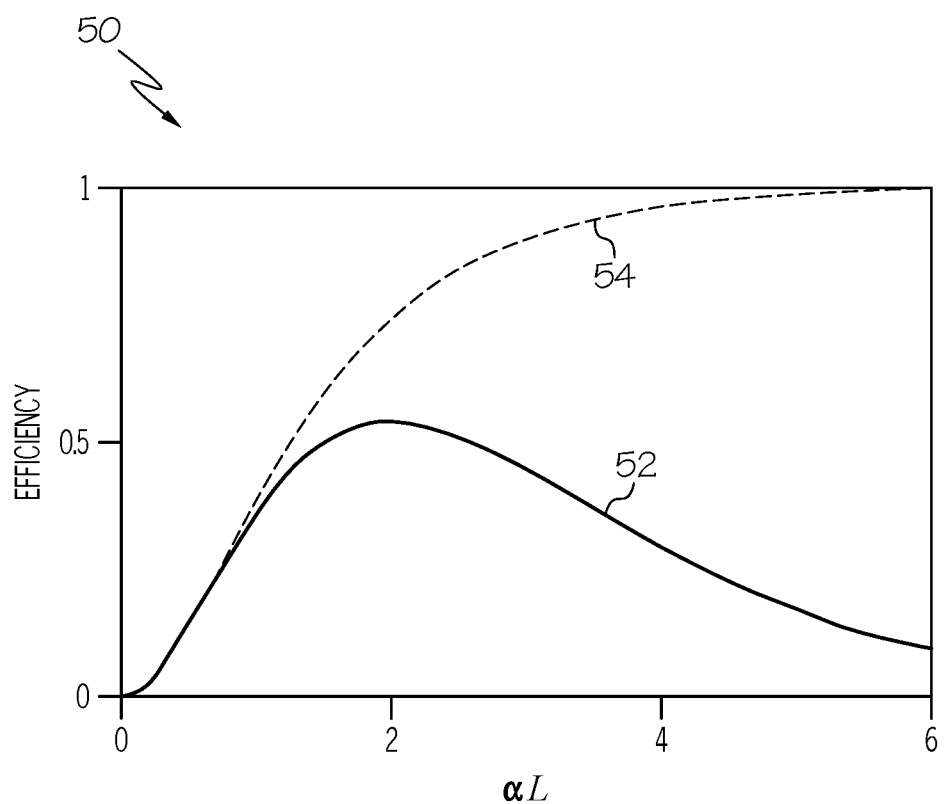
FIG. 4 graphically depicts quantum memory efficiency as a function of optical depth for a quantum memory when releasing stored particles using forward propagation and when releasing stored particles using backward propagation, according to one or more embodiments shown and described herein.

Referring now to FIG. 4, a graph 50 depicts quantum memory efficiency as a function of optical depth αL (e.g., absorption efficiency) for an example quantum memory that releases particles by forward emission (line 52) and by backward emission (line 54). During forward emission, the memory input direction of a quantum repeater is the same as the memory output direction, for example, releasing particles from a side of the quantum memory opposite the side that receives photon pulses from a photon source. During backwards emission, the memory input direction of a quantum memory is opposite the memory output direction (as shown in FIGS. 2 and 3). Without intending to be limited by theory, during forward emission, released particles may be partially reabsorbed by the material of the quantum memory, reducing the release efficiency of the quantum memory, thereby reducing the entanglement efficiency of the quantum memory and the efficiency of the quantum communications system 100. However, partial reabsorption can be reduced and/or eliminated by backward emission because backward emission suppresses the reabsorption of the released particle. Indeed, as shown in FIG. 4, backward emission can occur with an efficiency of up to 100% (line 54) while forward emission can occur at an efficiency of no greater than 54% (line 52).

In view of the foregoing description, it should be understood that multiple quantum repeaters positioned at a repeater node, each optically coupled to multiple channel switches, may be used to increase the efficiency of a quantum communications system. The channel switches allow received photon pulse sequences to be sequentially divided into sub-sequences and directed into different quantum repeaters allowing one quantum repeater to receive photons while another performs measurements on previously received photons, facilitating continuous operation of the quantum communications system while allowing for the backward emission of stored photons.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A quantum communications system comprising:
a first quantum repeater and a second quantum repeater each positioned at a repeater node and each comprising a first quantum memory and a second quantum memory; and
a first channel switch optically coupled to the first quantum repeater and a second channel switch optically coupled to the second quantum repeater; wherein:
 a first sub-channel extends between and optically couples the first channel switch and the first quantum memory of the first quantum repeater;
 a second sub-channel extends between and optically couples the first channel switch and the first quantum memory of the second quantum repeater;
 a third sub-channel extends between and optically couples the second channel switch and the second quantum memory of the first quantum repeater; and
 a fourth sub-channel extends between and optically couples the second channel switch and the second quantum memory of the second quantum repeater.

2. The quantum communications system of claim 1, further comprising a first photon source and a second photon source, wherein:
a first photon link extends between and optically couples the first photon source and the first channel switch; and
a second photon link extends between and optically couples the second photon source and the second channel switch.

3. The quantum communications system of claim 2, wherein the first photon source and the second photon source each comprise an entangled photon generator.

4. The quantum communications system of claim 2, wherein the first photon link and the second photon link each comprise an optical fiber.

5. The quantum communications system of claim 1, wherein:
the first channel switch is actuatable between a first optical engagement position, which optically couples the first channel switch and the first sub-channel, and a second optical engagement position, which optically couples the first channel switch and the second sub-channel; and
the second channel switch is actuatable between a first optical engagement position, which optically couples the second channel switch and the third sub-channel, and a second optical engagement position, which optically couples the second channel switch and the fourth sub-channel.

6. The quantum communications system of claim 1, wherein the first channel switch and the second channel switch each comprise an optical switch.

7. The quantum communications system of claim 1, wherein the first quantum repeater and the second quantum repeater each comprise entanglement optics having two or more entangling pathways optically coupled to and extending between the first quantum repeater and the second quantum repeater and two entanglement detector systems.

8. The quantum communications system of claim 7, wherein:
the entanglement optics further comprise a beamsplitter positioned such that each entangling pathway traverses the beamsplitter; and
the entanglement optics are structurally configured to entangle pairs of particles when particles output by the first quantum memory and the second quantum memory simultaneously traverse the beamsplitter.

9. The quantum communications system of claim 7, wherein the entanglement optics further comprise two or more optical switches.

10. The quantum communications system of claim 1, wherein the first quantum memory of each quantum repeater is structurally configured to, upon receipt of a photon pulse directed into the first quantum memory in an memory input direction, absorb the photon pulse thereby exciting an atomic ensemble state of the first quantum memory from a first energy state into a second energy state and, upon return of the atomic ensemble state of the first quantum memory to the first energy state, release a particle comprising quantum bit information of the received photon pulse from the first quantum memory in a memory output direction, opposite the memory input direction.

11. A method of communicating information, the method comprising:
outputting a first photon pulse sequence from a first photon source through a first photon link and into a first channel switch, wherein:
 the first channel switch is disposed between and optically coupled to the first photon link and both a first quantum repeater and a second quantum repeater, each positioned at a repeater node;
 a first sub-channel is optically coupled the first channel switch and the first quantum repeater;
 a second sub-channel is optically coupled to the first channel switch and the second quantum repeater; and
 the first channel switch is actuatable between a first optical engagement position, in which the first photon source is optically coupled to the first quantum repeater through the first sub-channel, and a second optical engagement position, in which the first photon source is optically coupled to the second quantum repeater through the second sub-channel;
directing a first sub-sequence of the first photon pulse sequence into the first sub-channel when the first channel switch is in the first optical engagement position, such the first quantum repeater receives the first sub-sequence of the first photon pulse sequence; and
switching the first channel switch from the first optical engagement position into the second optical engagement position, thereby directing a second sub-sequence of the first photon pulse sequence into the second sub-channel such that the second quantum repeater receives the second sub-sequence of the first photon pulse sequence.

12. The method of claim 11, wherein:
the first quantum repeater and the second quantum repeater each comprise a first quantum memory and a second quantum memory; and
the first sub-channel is optically coupled to the first quantum memory of the first quantum repeater and the second sub-channel is optically coupled to the first quantum memory of the second quantum repeater.

13. The method of claim 12, wherein:
the first quantum repeater and the second quantum repeater each comprise entanglement optics having two or more entangling pathways optically coupled to and extending between the first quantum memory and the second quantum memory and two entanglement detector systems;

the entanglement optics further comprise a beamsplitter positioned such that each entangling pathway traverses the beamsplitter; and the entanglement optics are structurally configured to entangle pairs of particles when particles output by the first quantum memory and the second quantum memory simultaneously traverse the beamsplitter.

14. The method of claim 11, and further comprising:

outputting a second photon pulse sequence from a second photon source though a second photon link and into a second channel switch wherein:

the second channel switch is disposed between and optically coupled to the second photon link and both the first quantum repeater and the second quantum repeater, a third sub-channel is optically coupled to the second channel switch and the first quantum repeater;

a fourth sub-channel is optically coupled to the second channel switch and the second quantum repeater; and the second channel switch is actuatable between a first optical engagement position, in which the second photon source is optically coupled to the first quantum repeater through the third sub-channel, and a second optical engagement position, in which the second photon source is optically coupled to the second quantum repeater through the fourth sub-channel; and directing a first sub-sequence of the second photon pulse sequence into the third sub-channel when the second channel switch is in the first optical engagement position, such the first quantum repeater receives the first sub-sequence of the second photon pulse sequence; and switching the second channel switch from the first optical engagement position to the second optical engagement position, thereby directing a second sub-sequence of the second photon pulse sequence into the fourth sub-channel such that the second quantum repeater receives the second sub-sequence of the second photon pulse sequence.

15. The method of claim 14, wherein:

the first quantum repeater and the second quantum repeater each comprise a first quantum memory and a second quantum memory;

the first sub-channel is optically coupled to the first quantum memory of the first quantum repeater and the second sub-channel is optically coupled to the first quantum memory of the second quantum repeater; and the third sub-channel is optically coupled to the second quantum memory of the first quantum repeater and the fourth sub-channel is optically coupled to the second quantum memory of the second quantum repeater.

16. The method of claim 15, wherein:

the first sub-sequence of the first photon pulse sequence and the first sub-sequence of the second photon pulse sequence are simultaneously directed into the first quantum memory and the second quantum memory of the first quantum repeater, respectively; and thereafter, the second sub-sequence of the first photon pulse sequence and the second sub-sequence of the second photon pulse sequence are simultaneously directed into the first quantum memory and the second quantum memory of the second quantum repeater, respectively.

17. The method of claim 16, further comprising:

absorbing the first sub-sequence of the first photon pulse sequence and the first sub-sequence the second photon pulse sequence using the first quantum memory and the second quantum memory of the first quantum repeater, respectively, thereby exciting an atomic ensemble state of the first quantum memory and the second quantum memory of the first quantum repeater from a first energy state into a second energy state; and upon return of the atomic ensemble state of the first quantum memory and the second quantum memory of the first quantum repeater to the first energy state, releasing, from the first quantum memory and the second quantum memory of the first quantum repeater, a plurality of particles comprising quantum bit information of the received first sub-sequences.

18. The method of claim 17, wherein:

the plurality of particles comprising the quantum bit information of the received first sub-sequences are released from the first quantum memory in a first memory output direction and released from the second quantum memory in a second memory output direction; and the first memory output direction of the first quantum memory is opposite a first memory input direction of the first quantum memory and the second memory output direction of the second quantum memory is opposite a second memory input direction of the second quantum memory.

19. The method of claim 17, wherein, when the second sub-sequence of the first photon pulse sequence and the second sub-sequence of the second photon pulse sequence are simultaneously directed into the first quantum memory and the second quantum memory of the second quantum repeater, the plurality of particles comprising quantum bit information of the received first sub-sequences are released from the first quantum memory and the second quantum memory of the first quantum repeater.

20. The method of claim 14, wherein the first photon source and the second photon source each comprise an entangled photon generator.

* * * * *

UNITED STATES PATENT AND TRADEMARK OFFICE
CERTIFICATE OF CORRECTION

| | |
|---|---|
| PATENT NO. | : 11,621,785 B2 |
| APPLICATION NO. | : 17/619079 |
| DATED | : April 4, 2023 |
| INVENTOR(S) | : Nikolay Alekseyevich Kaliteevskiy et al. |

It is certified that error appears in the above-identified patent and that said Letters Patent is hereby corrected as shown below:

On the Title Page

On the page 2, in item (56), in Column 2, under "Other Publications", Line 2, delete "Artile" and insert -- Article --.

Signed and Sealed this
Eighth Day of August, 2023

Katherine Kelly Vidal
*Director of the United States Patent and Trademark Office*